Patented May 17, 1932

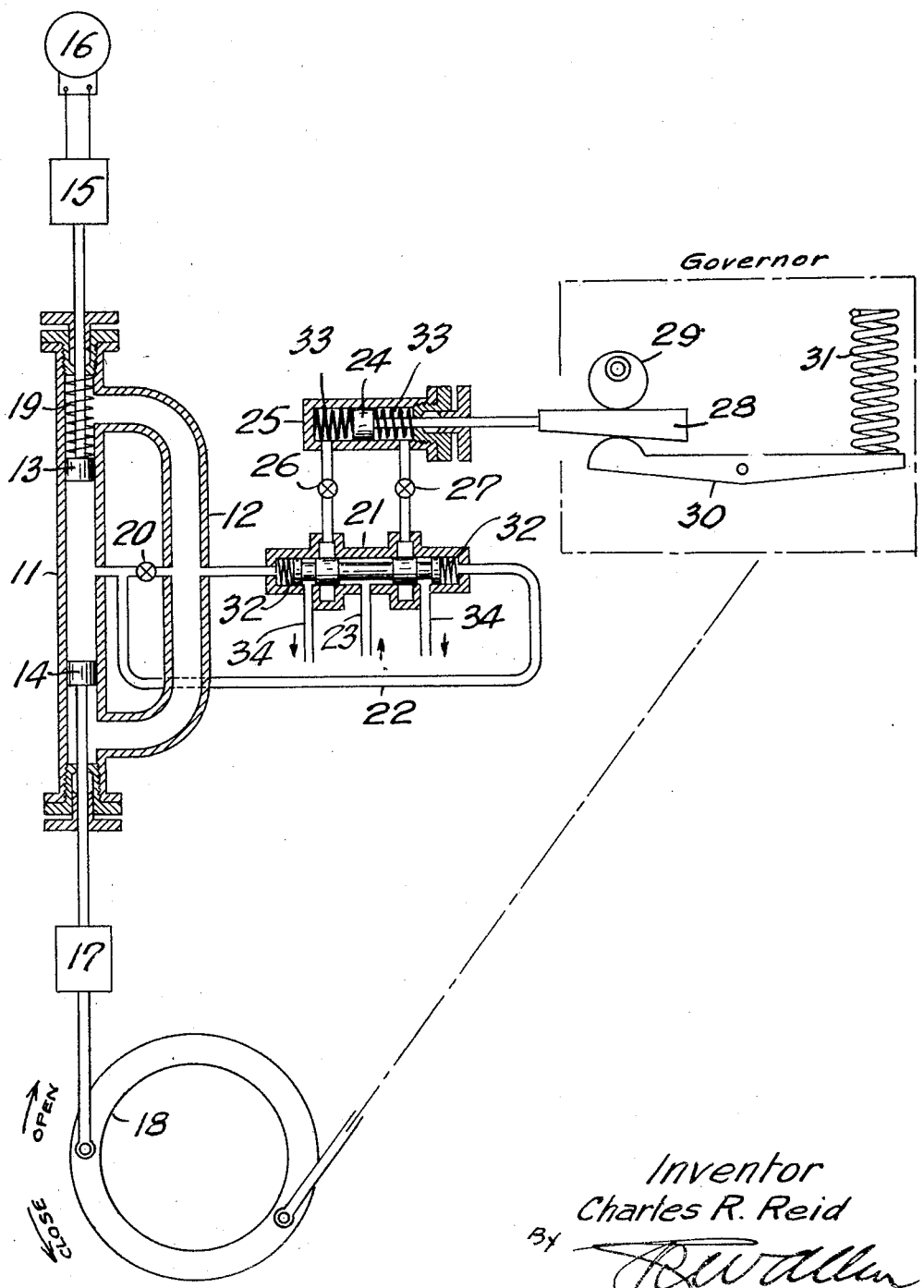

1,858,939

UNITED STATES PATENT OFFICE

CHARLES R. REID, OF SHAWINIGAN FALLS, QUEBEC, CANADA

PROCESS OF AND APPARATUS FOR GOVERNING THE SPEED OF PRIME MOVERS

Application filed January 9, 1929. Serial No. 331,165.

This invention relates to a process of governing and to governors for prime movers such as turbines, and aims to provide a governing system and apparatus which may be used alone or used as a supplement to existing governors.

The object of the invention is to provide for regulation of a prime mover, in accordance with load changes in the prime mover or in a driven machine, to maintain substantially constant speed, the regulation being effected with such promptitude as to anticipate speed changes in the prime mover and prevent or greatly limit them.

This invention is based on the fact that while load changes may be and usually are instantaneous, especially when load is dropped, the speed changes occasioned by them are not instantaneous but are evident only after an appreciable interval of time necessary for the overcoming of inertia. Even when a speed change becomes evident, the entire change, corresponding to the load change, does not take place at once but occurs through an appreciable period of acceleration or reduction.

According to the present invention, the load in a prime mover or in a driven machine is used as the governing factor and changes in load are applied to regulate the prime mover in anticipation of speed changes which would otherwise occur and in such a way as to substantially prevent their occurrence or at least hold them within predetermined limits.

One field in which the invention is particularly applicable is the governing of water turbines driving electric generators, and the invention will therefore be explained in this connection. It must be understood, however, that the invention is not limited to this field of application or to the particular embodiment disclosed but extends to governing other types of prime movers and to governing prime movers driving other types of machines, as well as to other embodiments either in the particular use described or in other uses.

For the purposes of this invention, load in the prime mover may be taken as being one with load in the driven machine, since it is a reflection of load in the driven machine, but in most instances it is more convenient and practical to measure the load in the driven machine and apply its variations to regulate the prime mover. This method also avoids imposing upon the regulation a possibly greater time loss in transmission of the load variation to the prime mover and its measurement at the prime mover.

The operation of turbine governors now in general use depends upon the speed of the turbine and generator and changes in load conditions must manifest themselves in change of speed before the governor becomes effective to regulate the turbine to return to its predetermined speed. For example, if the load on the generator is suddenly reduced, the turbine tends to race. A quite appreciable time elapses between the change of load and any material change of speed. Ordinary governing systems thus do not come into action until the speed change is evident and, in order to overcome the acceleration, over-governing is usually resorted to. Also, the governor is necessarily very sensitive and there is a constant undesirable hunting tendency or actual hunting effect.

In the above defined application of the invention, the load condition of the generator and the gate adjustment of the turbine are controlling factors in imposing a suitable adjustment on the ordinary governor of the turbine. This may be accomplished in a variety of ways of which one is, in its essentials, the provision of a pair of pistons located at spaced points in a liquid filled receptacle and operatively connected, one to a wattmeter or other suitable load indicator and the other to the turbine gate ring. Fluid pressure is transmitted from the receptacle at a point between the pistons to a control valve to actuate the valve to control the power supply to any suitable means for imposing an adjustment on the ordinary turbine governor independent of the adjustment resulting from change of turbine speed. The arrangement includes automatically operating resetting means.

In the accompanying drawing which illustrates the above outlined embodiment of the invention, but to the details of which the invention is not confined, since numerous modifications and substitution of equivalents may be effected, the single figure is a sectional view of the apparatus with related devices shown diagrammatically.

Referring more particularly to the drawing, 11 designates a cylinder and 12 a by-pass passage connecting the ends of the cylinder. It is evident that the cylinder and by-pass form an endless closed conduit. A pair of normally spaced pistons 13 and 14 are located in the cylinder between the ends of the by-pass. The piston 13 is connected for operation by any suitable means 15 controlled by a generator load indicating device, such as a wattmeter 16. The piston 14 is connected through any suitable operating or transmission means 17 with the gate ring 18 of the turbine. A spring 19 may be provided in the cylinder to assist the movement of the piston 13 upon necessity for speed reduction. A restoring means is provided comprising a needle valve connection 20, or equivalent, between the by-pass 12 and the cylinder at a point between the pistons.

A control valve 21, which may conveniently be of the piston type shown or of any other suitable type, is connected on one side by a pipe 22, or equivalent, with the cylinder between the pistons and is connected on the other side with the by-pass 12. This valve is designed to admit fluid pressure supplied through the pipe 23 to either side of a piston 24 contained in an operating cylinder 25. Regulating valves 26 and 27 may be provided between the valve 21 and the cylinder 25. The piston 24 is operatively connected in any suitable way to the turbine governor to regulate same. One method of connection suitable for certain types of governors is by means of a wedge 28 connected to the piston and interposed between the equalizing cam 29 and the lever 20 through which the cam action is transmitted to the speeder spring 31 of the governor, which in turn adjusts the gate ring 18. Restoring springs 32 are provided on opposite sides of the valve 21 and heavier restoring springs 33 on opposite sides of the piston 24. Return pipes 34 are provided for the fluid admitted through the pipe 23.

The system comprising the cylinder 11, by-pass 12, valve 21 and connections between them is filled with any suitable fluid (preferably oil) and the pipes 23 and 34 are connected to any suitable source of fluid, preferably the operating fluid of the ordinary governor.

It will be observed that the piston 13 is by-passed through the passages 12 and 22, and that the piston of valve 21 forms an obstruction in this by-pass capable of movement upon movement of the piston 13. Also, each of the pistons 13 and 14 individually is by-passed through the passage 12 and flow retarding valve 20, so that upon movement of either to create unbalanced pressures on opposite sides of it, the pressures will be eventually restored through the valve 20. Further, the pipe 22 constitutes a loop having both ends connected to the cylinder between the pistons 13 and 14, which loop is obstructed by the piston of valve 21 and the flow retarding valve 20, and the passage 12 constitutes a fluid receiver between the valves 21 and 20. If either piston 13 or 14 moves so as to reduce the volume of the cylinder between them, a movement of fluid occurs in the loop passage 22 and causes operation of the valve 21, because the valve 20 causes greater resistance to flow through one arm of the loop passage into the receiver than through the other arm of the passage.

The operation is as follows:—

The wattmeter will cause the piston 13 to assume a position proportional to the load on the generator and the piston 14, being connected to the turbine gate ring, assumes a position proportional to the gate opening. Assuming that under no-load conditions the pistons 13 and 14 are both at the lowest points of their travel and spaced apart as shown; as the load comes on the generator the ordinary governor opens the turbine gates and the pistons both rise, without alteration of the distance between them, until at full load they are at the highest points of their travel. During this movement there is no change in the pressure of the fluid filling the system, the fluid between the pistons merely moving up and the fluid expelled from above piston 13 flowing through the by-pass into the space made available below piston 14.

If, now, any considerable part of the generator load is dropped the wattmeter becomes instantly effective through the means 15 to release or depress the piston 13. If the piston is merely released, the spring 19 operates to depress it. This causes fluid to be expelled from between the pistons through the pipe 22 to the valve 21, to move the piston thereof to the left and admit fluid from the supply pipe 23 through the valve to the left hand end of the cylinder 25. The piston 24 is thus moved to the right and drives the wedge to the right, so as to reduce the tension of the speeder spring and the ordinary governor and cause the same to reduce the turbine gate opening. The regulating effect of the attachment persists for only a short time, usually a matter of seconds. As soon as the governor becomes effective to start the turbine gates closing, the movement is communicated to and lowers the piston 14, thus reducing the pressure in the cylinder. At the same time, the pressure in the cylinder has been gradually equalizing with the pressure in the by-pass by reason of a very slow flow through the needle valve 20.

Under these conditions the valve 21 is readily restored to normal by the springs 32. The more powerful springs 33 restore the piston 24 to normal position once the pressure is cut off by the valve 21 and the wedge is thus reset. The needle valve 20 together with the valves 26 and 27 limiting movement of fluid or transmission of pressure in the system permit of adjustment of the wedge motion, so that it will correspond correctly to the amount of load dropped and secure, at least approximately, the right amount of gate movement to correct for it.

From the foregoing, it will be readily seen that adjustment of the turbine gates is secured almost instantly upon reduction of load on the generator. This adjustment is secured before the turbine commences to speed up in response to the lightened load, so that the speeding is avoided, as compared with the usual regulation which follows and depends upon the speeding.

The connection at 17 should, theoretically, be such as to reflect in the position of the piston 14 the power delivered by the turbine rather than the actual gate opening, but reflection of the gate opening is usually close enough for realization of satisfactory results.

Numerous alterations may be made in disposition of the parts, which are shown only diagrammatically, also by substitution of equivalent elements. For example, the pistons 13 and 14 are shown in axial alignment but this may be departed from, also the receiver for fluid expelled from the left hand end of the valve, which is in the diagram the by-pass 12, may be differently constructed and arranged. Other types of valves may be substituted for the control valve 21 and other means substituted for the valves 20, 26 and 27.

While the invention has been described only in one embodiment and only in its application to water turbines driving electric generators, it will be understood that it is not thus limited, but may be otherwise applied as aforesaid by utilization of any suitable device, responsive to load in prime mover or driven device, connected to regulate the prime mover in anticipation of speed changes which would otherwise result from load changes.

Having thus described my invention, what I claim is:—

1. Means for governing the speed of prime movers having power supply regulating means which comprises, means responsive to load variations, a vessel adapted to contain an incompressible fluid, a pair of pistons positioned to confine fluid in said vessel, said pistons being operatively connected respectively to said sensitive means and to the power supply regulating means for movement thereby, and fluid pressure operated means connected to said vessel to receive therefrom fluid expelled by relative movement of said pistons, said fluid pressure operated means being also operatively connected with the motive fluid supply regulating means of the prime mover to adjust the same in accordance with load variations.

2. Means for governing the speed of turbines having gate rings and driving electric generators, which comprises a wattmeter connected to the generator, a pair of relatively movable elements operatively connected respectively to the wattmeter and to the gate ring of the turbine, and means influenced by relative movement of said movable elements to adjust the gate ring.

3. Means for governing the speed of turbines having gate rings and driving electric generators, which comprises a wattmeter connected to the generator, a fluid filled receptacle, a pair of pistons in said receptacle operatively connected respectively to the wattmeter and to the turbine gate ring, means for adjusting the gate ring, a valve controlling supply of power to said adjusting means, and a connection to conduct fluid expelled from the receptacle, by movement of said pistons, to the valve for operation thereof.

4. Means for governing the speed of turbines having gate rings and adjusting mechanism therefor and driving electric generators, which comprises a wattmeter connected to the generator, a fluid filled receptacle, a pair of pistons spaced apart in the receptacle and operatively connected respectively to the wattmeter and to the gate ring of the turbine, means to control the operation of gate ring adjusting mechanism, a fluid connection from the receptacle, at a point between the pistons, to said means, for transmission of fluid expelled from the receptacle by relative movement of the pistons, for operation of said means.

5. In combination with a device according to claim 4, a by-pass connecting the ends of the receptacle, a valved pressure equalizing connection between the by-pass and the receptacle between the pistons, and a pressure equalizing connection between the by-pass and the controlling means.

6. Means for governing the speed of turbines having gate rings and driving electric generators, which comprises the combination with a turbine governor operatively connected with the gate ring of the turbine, of a watt meter connected to the generator, a pair of relatively movable elements operatively connected respectively to the wattmeter and to the gate ring, and means influenced by relative movement of said movable elements to actuate the governor, independently of its normal operation, to adjust the gate ring.

7. Means for governing the speed of turbines having gate rings and driving electric generators, which comprises the combination with a turbine governor operatively connected with the gate ring of the turbine and including a speeder spring, an equalizing cam and a lever operatively connected between the cam and spring, of a wattmeter connected to the generator, a pair of relatively movable elements operatively connected respectively to the wattmeter and to the gate ring, a wedge between the equalizing cam and the lever and means influenced by relative movement of said movable elements to move the wedge and thereby to cause the governor to adjust the gate ring.

8. A device according to claim 4, in which the means to control operation of gate ring adjusting mechanism comprises a piston valve to control flow of motive fluid to and from said adjusting mechanism and in which the fluid connection discharges fluid against one end of the valve piston, in combination with a fluid pressure equalizing connection from the opposite end of the valve piston to the cylinder and valve piston resetting springs.

9. Means for governing the speed of turbines having gate rings and driving electric generators, which comprises the combination with the ordinary speed governor operatively connected with the gate ring of the turbine and including a fluid pressure operating system, a speeder spring, an equalizing cam and a lever operatively connecting the cam and spring, of a wattmeter connected to the generator, a pair of relatively movable elements operatively connected respectively to the wattmeter and to the gate ring, a closed fluid pressure system, independent of the governor fluid pressure system, in which the pressure may be increased by relative movement of said elements, a wedge between the equalizing cam and lever, a wedge operating piston, a cylinder containing said wedge operating piston, a piston valve connected in governor fluid system to control fluid flow to and from said wedge piston cylinder, a by-pass in said closed system, extending from one side to the other of the wattmeter operated element and obstructed by the piston of said piston valve, whereby upon movement of the wattmeter operated element effectively relative to the gate ring operated element the piston valve is operated to admit fluid pressure of the governor system to the wedge piston cylinder for movement of the wedge to actuate the governor to adjust the gate ring.

10. In combination with a device according to claim 9, a second by-pass from one side to the other of said watt-meter operated element, a needle valve in said second by-pass enabling a retarded equalization of pressures on opposite sides of the wattmeter operated element, and restoring springs for said valve piston and wedge operating piston.

11. Means for governing the speed of turbines having gate rings and driving electric generators, which comprises a wattmeter connected to the generator, a fluid receptacle, a wattmeter operated piston in said receptacle, a fluid filled conduit connected at both ends to the receptacle on one side of the wattmeter operated piston, a piston valve the piston of which forms an obstruction in said conduit, a flow regulating valve between the piston valve and receptacle, a fluid receiver between the piston valve and regulating valve, and means controlled by operation of the piston valve to adjust the gate ring of the turbine.

12. In combination with a device according to claim 11, a second piston in the receptacle connected to the gate ring of the turbine for movement thereby to compensate for movement of the wattmeter operated piston.

13. In speed governing mechanism for prime movers including power supply regulating means, the combination with means responsive to variation of load on the prime mover of a fluid receptacle, a pair of relatively movable spaced pistons in the receptacle connected one to said power supply regulating means and the other to said responsive means and adapted to imprison fluid between them, a fluid pressure operated device operatively connected with said power supply regulating means to actuate same, a fluid transmitting connection between said device and the receptacle at a point between the pistons, a fluid receiver, fluid transmitting connections between said device and the receiver and between the receiver and the receptacle at a point between the pistons, said last mentioned connection being of restricted size relatively to the other connections thereby to retard fluid flow from the receiver to the receptacle.

14. In speed governing mechanism for prime movers including power supply regulating means, the combination with means responsive to variation of load on the prime mover, of a fluid receptacle, a pair of relatively movable pistons in the receptacle connected one to said power supply regulating means and the other to said responsive means and adapted to imprison a portion of the fluid in said receptacle between them, a by-pass connecting portions of the receptacle beyond the pistons, a fluid pressure operated device operatively connected with said power supply regulating means to actuate same, fluid transmitting connections between said device and the receptacle between the pistons and between said device and the by-pass, and a valve adapted to permit fluid transfer slowly from the by-pass to the receptacle between the pistons.

In witness whereof, I have hereunto set my hand.

CHARLES R. REID.